US010761609B2

(12) United States Patent
Chung et al.

(10) Patent No.: US 10,761,609 B2
(45) Date of Patent: Sep. 1, 2020

(54) USER WEARABLE INTERFACE DEVICE HAVING FORCE FEEDBACK

(71) Applicant: REALGAM CO., LTD., Sungnam-si, Gyeonggi-do (KR)

(72) Inventors: Yon Woo Chung, Seoul (KR); Bok Sung Oh, Anyang-si Gyeonggi-do (KR); Yun Ho Lee, Anyang-si Gyeonggi-do (KR)

(73) Assignee: REALGAM CO., LTD., Sungnam-si (KR)

( * ) Notice: Subject to any disclaimer, the term of this patent is extended or adjusted under 35 U.S.C. 154(b) by 0 days.

(21) Appl. No.: 16/311,496

(22) PCT Filed: Feb. 14, 2018

(86) PCT No.: PCT/KR2018/001982
§ 371 (c)(1),
(2) Date: Dec. 19, 2018

(87) PCT Pub. No.: WO2019/160179
PCT Pub. Date: Aug. 22, 2019

(65) Prior Publication Data
US 2019/0250711 A1    Aug. 15, 2019

(51) Int. Cl.
*G06F 3/01*    (2006.01)

(52) U.S. Cl.
CPC ............. *G06F 3/016* (2013.01); *G06F 3/011* (2013.01)

(58) Field of Classification Search
CPC ....................................... G06F 3/016
USPC ....................................... 345/156
See application file for complete search history.

(56) References Cited

U.S. PATENT DOCUMENTS

| 2012/0142416 | A1* | 6/2012 | Joutras | A63B 24/0006 463/36 |
| 2014/0240109 | A1* | 8/2014 | Aviles | G06F 3/014 340/407.1 |
| 2019/0176320 | A1* | 6/2019 | Smith | B25J 3/04 |
| 2019/0302887 | A1* | 10/2019 | Sinclair | G05G 5/03 |

\* cited by examiner

*Primary Examiner* — Long D Pham
(74) *Attorney, Agent, or Firm* — Sughrue Mion, PLLC (57) ABSTRACT

An interface device includes a first fixed portion and a first rotation portion which are fixed to a body, a first power portion which is connected to the first fixed portion and the first rotation portion and provides power to the first rotation portion, and a control unit which controls the first power portion to control rotation of the first rotation portion when receiving a signal from an external device, and the first power portion switches the first rotation portion to a free state of being rotatable by external force or a control state of being not rotatable by external force in accordance with a signal of the control unit.

10 Claims, 6 Drawing Sheets

USER WEARABLE INTERFACE DEVICE HAVING FORCE FEEDBACK

CROSS REFERENCE TO RELATED APPLICATIONS

This application is a National Stage of International Application No. PCT/KR2018/001982 filed Feb. 14, 2018.

TECHNICAL FIELD

The present invention relates to an interface device, and more specifically, to an interface device which receives user's motion data and supports a user who uses the interface device to feel external force and impact embodied in virtual environment.

BACKGROUND ART

Technology in which a user can easily experience virtual reality or can experience 3D images with reality has been developed through sustainable development of virtual reality implementation equipment, virtual reality contents of 3D, 4D and the like, and wired and wireless network.

Particularly, for more realistic virtual reality experience, technology of controlling a virtual reality image by representing dynamic change on a virtual reality image in accordance with motion of a person was developed, and as technology related thereto, there are Korean Registered Patent No. 10-1485414, Korean Laid-Open Patent No. 10-2015-0123307, and the like.

However, the above-described inventions do not provide clear distinction for a freewheeling state, a no-load state, and a load state and differentiated functions for each state according thereto in sense transmission of external force and impact to be transferred to a user who uses an interface device in accordance with contents embodied in a virtual space.

In other words, when using the above-described inventions, there is a problem that difference occurs between a real-time state implemented through contents of virtual reality and restriction requirements of sense or motion actually transferred to a user through a device (for example, a device according to the above-described invention does not generate separate load and a situation in which a user can freely move occurs although the device has to restrict user's movement in virtual reality, and mechanical resistance occurs by coupling and engagement among constituent elements of a device according to the above-described invention and user's movement of is restricted although it is necessary to implement a freely moving state in virtual reality).

Accordingly, it has been essentially required to implement environment in which a state of virtual reality can be more accurately and clearly transferred to a user device and a user can further immerse in contents of virtual reality to reduce mismatch between virtual reality and reality and to satisfy requirement for further raising immersion and a user can further immerse in contents of virtual reality.

However, the related inventions merely divides a representation state (reality implementation through a device) according to virtual reality only with dichotomous division such as a free state (a state where a device freely move) and a load state (a state where movement of a device is restricted), does not further accurately distinguish more segmentalized states such as a freewheeling state, a no-load state, and a load state to be presented through the present invention, and difference among states, and there is a limit that it is difficult to appropriately apply operation of a device used by a user in accordance with internal and external signals or the like of contents or the like of virtual reality.

SUMMARY OF INVENTION

Technical Problem

A technical problem of the present invention is to implement a state where a state implemented through an interface device in accordance with environment of virtual reality is segmentalized into a freewheeling state, a no-load state, and a load state.

Herein, the freewheeling state may be defined as a state where a grip module can be freely moved in accordance with user's intention without mechanical resistance through physical block (uncoupling) between the grip module (output unit) which is movable such as free rotation and a power module (input unit).

The no-load state may be defined as a state where power is not supplied through the power unit but where mechanical resistance according to physical coupling configuration (engagement or the like) between the grip module and the power module occurs in a certain level, and may be defined as a state where a certain level of torque is necessary in movement such as rotation of the grip module different from the freewheeling state.

The load state may be defined as a state where power is supplied through the power unit, and where power is transmitted from the power unit to the grip module through physical coupling between the grip module and the power unit and control of rotational force stronger than the no-load state in movement of the grip unit is generated to control user's free movement.

However, a technical problem of the present invention is not limited to the technical problem described above, and should include even a part clearly understood and inferred for a person skilled in the art from the description of the present invention although not described.

Solution to Problem

To achieve the technical problem, an embodiment of the present invention provides an interface device.

In the embodiment of the present invention, the interface device includes: a body module which is attachable to a part of user's body; a power module which has one end portion coupled to the body module and supplies power; and a grip module which is movable by the power received from the power module, wherein the grip module is movable in a first direction and a second direction with respect to the body module, and the first direction may not be parallel with the second direction, wherein the power module includes: a power unit which generates rotational force; and a clutch unit which transfers the rotational force received from the power unit to the grip module, and wherein the power module selectively implements any one state of: a freewheeling state where the power unit and the grip module is physically uncoupled through the clutch; a no-load state where the power unit and the grip module are physically coupled through the clutch unit; a load state where the power unit and the grip module are physically coupled through the clutch unit, and the rotational force of the power unit is transferred to the grip module.

In addition, the clutch unit of the interface device according to the embodiment of the present invention may include a resistance module, wherein the resistance module controls formation or release of physical coupling between the power unit and the grip module through the clutch unit, wherein the power module controls generation or extinction of rotational force which can be transferred to the grip module through the power unit, and selectively implement any one state of the freewheeling state, the no-load state, or the load state of the grip module by selectively combining the formation and release of the physical coupling through the resistance module and the generation and extinction of the rotational force through the power module.

In addition, the resistance module according to the embodiment of the present invention may be a solenoid or a spring.

In addition, the clutch unit may include: an outer housing which is coupled to the grip module; a power transmission cam which is accommodated in the outer housing and receives the rotational force from the power module; and an armature which receives the rotational force of the power transmission cam by a plurality of rollers in a state of being accommodated in the outer housing and is rotatable in accordance with pushing rotation of the rollers, and wherein the armature generates rotation speed difference between the outer housing and the armature by the resistance module.

In addition, the freewheeling state may be a state where the power unit and the grip module are physically uncoupled through the clutch unit in accordance with supply of voltage equal to or more than a threshold value to the resistance module and thus rotational force is not transferred through the power unit.

The freewheeling state according to the embodiment of the present invention may be a state where the armature is physically completely uncoupled from the outer housing by the resistance module so the outer housing is not controlled by the armature and the power unit at all, and accordingly, the grip module is movable in unparallel in the first and second directions, and the unparallel movement is implemented in a state capable of free rotation and movement by user's intention by a state where the physical coupling between the outer housing and the armature is released.

In addition, the load state according to the embodiment of the present invention may be a state of controlling the rotational force of the outer housing by a user through supply of power by the power unit, in a state where the outer housing and the armature are physically coupled through the plurality of rollers fitted between arc portions of the armature, and the no-load state may be implemented in a no-load state of not controlling the rotational force of the outer housing by a user through power supply cutoff by the power unit, in a state where the outer housing and the armature are physically coupled through the plurality of rollers fitted between arc portions of the armature.

In addition, the body module may be a wrist module which is wearable on a wrist of user's specific body portion.

In addition, the body module may be an elbow module which is wearable on a part of a cuff of user's body, and in this case, the grip module may be movable in the first direction with respect to the elbow module, and the first direction is substantially parallel to a movement direction of user's body joint on which the elbow module is worn.

Advantageous Effects of Invention

According to the embodiment of the present invention, the interface device can implement a state of virtual reality in more segmentalized states and steps such as a freewheeling state, a no-load state, and a load state, and there is an advantage that a user can more easily immerse in virtual reality as compared with the existing invention.

Advantages of the present invention are not limited to the above-described advantage, and should be understood as including all advantages which can be inferred from configurations of the present invention described in Detailed Description or Claims of the present invention.

BRIEF DESCRIPTION OF DRAWINGS

FIGS. 9A and 9B are diagrams illustrating a clutch unit at the time of load switching of an interface device according to an embodiment of the present invention.

FIGS. 10A and 10B are diagrams illustrating a clutch unit at the time of switching to freewheeling state of an interface device according to an embodiment of the present invention.

DESCRIPTION OF EMBODIMENTS

Hereinafter, the present invention will be described with reference to the accompanying drawings. However, the present invention may be embodied in various different forms, and is not limited to embodiments described herein. In order to clearly describe the present invention in the drawings, parts which are not related to the description are omitted, and similar reference numerals and signs are given to similar parts throughout Specification.

Throughout Specification, when it is described that a certain part is "connected (coupled, contacted, or combined)" to the other part, this includes a case of "indirect connection" with another member interposed therebetween as well as a case of "direct connection." In addition, when it is described that a certain part ""includes" a certain constituent element, it means that the part does not exclude another constituent element but may further have another constituent element unless otherwise described.

Terms used in Specification are used to merely explain a specific embodiment, and does not intent to limit the present invention. Singular expression includes plural expression unless clearly differently meaning contextually. In Specification, terms such as "include" or "have" are to designate that there are features, numerals, steps, operations, constituent elements, components, or combination thereof described in Specification, but it should be understood that existence or addition possibility of one or more other features, numerals, steps, operations, constituent elements, components, or combination thereof is not excluded in advance.

Hereinafter, embodiments of the present invention will be described with reference to the accompanying drawings.

Figure 1:
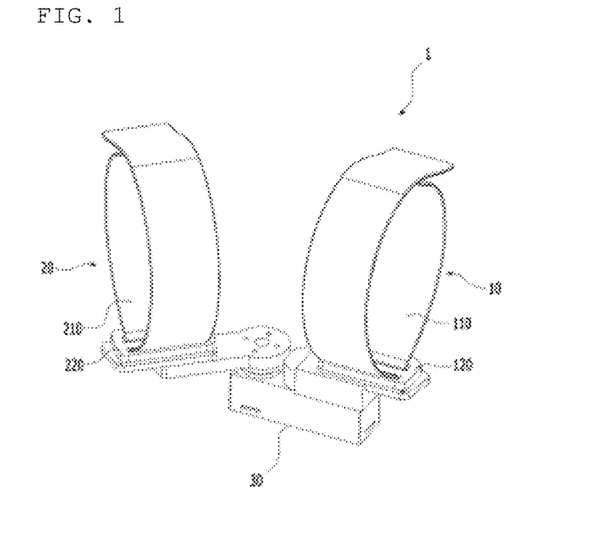
FIG. 1 is a diagram illustrating an interface device according to an embodiment of the present invention.

FIG. 1 is a diagram illustrating an interface device 1 according to an embodiment of the present invention.

As illustrated in FIG. 1, an interface device 1 according to the embodiment of the present invention includes a body module 10, a grip module 20, and a power module 30.

The body module 10 and the grip module 20 are constituent elements fixed or attached to a part or around a joint of user's body, and may include separate attachment portions 110 and 210 as illustrated in FIG. 1 to be attachable to a part of user's body of the interface device 1.

In addition, the body module 10 and the grip module 20 may additionally include connection members 120 and 220, a part of which can be coupled to be movable such as rotation, vertical, and/or horizontal movement (for example, the grip module 20 is rotatable or movable in various directions such as a first direction and a second direction with respect to the body module 10, and in this case the first direction and the second direction are in various directions such as parallel and/or unparallel directions) with respect to the power module 30.

In addition, according to the embodiment of the present invention, the body module 10 may be provided as a wrist module attachable to a wrist of user's body, and hereinafter, instead of the body module 10, the wrist module 10 is specified. However, as described above, this is only according to the embodiment of the present invention, and the body module 10 according to the present invention may be provided by reflecting various physical characteristics and types such as an ankle module attached to an ankle and an elbow module attached to an elbow as well as a wrist module 10 to be described hereinafter in priority.

When a type of elbow module attachable to a part of an wrist of user's body is provided according to an embodiment of the present invention, the grip module 20 is movable in a first direction with respect to an elbow module (not illustrated), and the first direction may be designed such that user's body joint to which the elbow module (not illustrated) is attached is movable substantially in parallel to the same direction.

The wrist module 10 may include an arm attachment portion 110 and a hand attachment portion 210 to be attachable to an arm and a hand of a body, and even in this case, as illustrated in FIG. 1, the arm attachment portion 110 and the hand attachment portion 210 are ring-shaped members to be fixed to user's body, and have a role of a constituent element which couples the interface device 10 and user's body. To this end, it is preferable that the arm attachment portion 110 and the hand attachment portion 210 are formed of a flexible material or a Velcro material to be variable in accordance with a thickness of user's body, but they are not limited thereto.

The connection members 120 and 220 are constituent elements for connecting the wrist module 10 or the grip module 20 to the power module 30, but may not be required when the arm attachment portion 110 and the hand attachment portion 210 are directly connected to the power module 30.

The power module 30 is a constituent element which transfers movement such as rotational, horizontal, and vertical motion of the grip module 20 to a control unit, or switches the grip module 20 to a freewheeling state, a no-load state, or a load state.

To this end, the power module 30 is connected to the wrist module 10, and may be connected to be movable such as rotation with respect to the grip module 20, and n power portions and n rotation portions may be additionally formed as many as the number of joint rotation directions necessary for support of more smooth up, down, left, right, and/or rotational movement of the grip module 20.

Figure 2:
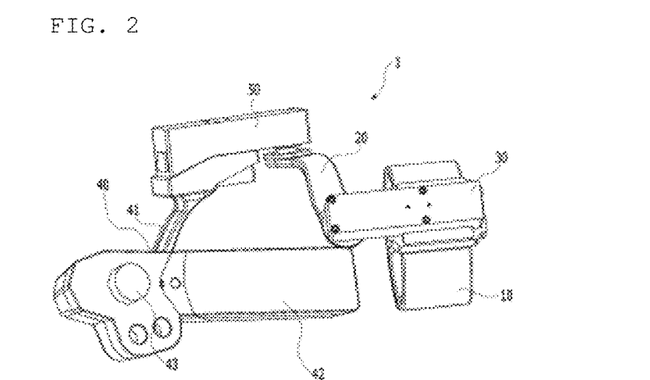
FIG. 2 is a diagram illustrating an interface device according to an embodiment of the present invention.

FIG. 2 is a diagram illustrating an interface device 1 according to another embodiment of the present invention.

In a grip module 20 of an interface device 1 according to another embodiment of the present invention, one area may be formed in a curved bar shape. In the grip module 20 having one area having the curved bar shape, the curved area may be inserted between a joint and a joint such as between fingers, or may be connected, when there is the other power unit in addition to the power module 30, to the other power unit.

In addition, as illustrated in FIG. 2, the interface device 1 according to another embodiment of the present invention may further include a second grip module 40 and a second power module 50.

The second grip module 40 is a constituent element which can be switched to a freewheeling state, a no-load state, or load state by the second power module 50 to be described later. In addition, the second grip module 40 may additionally include a connection portion 41 and a grip portion 42. The connection portion 41, a part of which is connected to the second power module 50, may be formed in a form capable of being inserted between a joint and a joint such as between fingers. In addition, one end of the connection portion 41 is provided with the grip portion 42, and the grip portion 42 may be formed to be gripped by user's hand. In this case, according to the embodiment of the present invention, the grip portion 42 may be provided with a sub-interface device 43. FIG. 2 illustrates a joystick formed as the sub-interface device 43, and the joystick may be formed at a position corresponding to user's thumb to be controlled by user's thumb. The sub-interface device 43 may be variously formed such as a wheel or a button in addition to the joystick.

The second power module 50 is a constituent element which transfers rotation of the second grip module 40 to a control unit or can switch the second grip module 40 to a freewheeling state, a no-load state, or a load state in accordance with a control signal received from a control unit, and end portions may be coupled to the grip module 20 and the second grip module 40, respectively. In this case, the second power module 50 may be connected to the grip module 20 to be movable in a rotational, vertical, and/or horizontal directions.

In addition, according to the embodiment of the present invention, it is possible to effectively cope with various characteristics and structures of a body, and the n-th power module (not illustrated) and the n-th grip module (not illustrated) may be additionally provided in the same or similar form as the second power module 50 and the second grip module 40 being coupled in a module type with respect to the grip module 20 and the power module 30 to transmit an optimal force feedback necessary for a user of the interface device 1 in accordance with kind and substance of contents of provided from the outside, in a same number as n combinations or may be provided by combinations with a different, number such as an m-th power module and an n-th grip module.

As illustrated in FIG. 2, since the power module 30 and the second power module 50 are provided in a curved bar shape or the like and are connected by the grip module 20, the power module 30 can control rotation in a first direction, and the second power module 50 can control rotation in a various second direction such as a direction parallel and/or unparallel to the first direction or a perpendicular direction.

Figure 3:
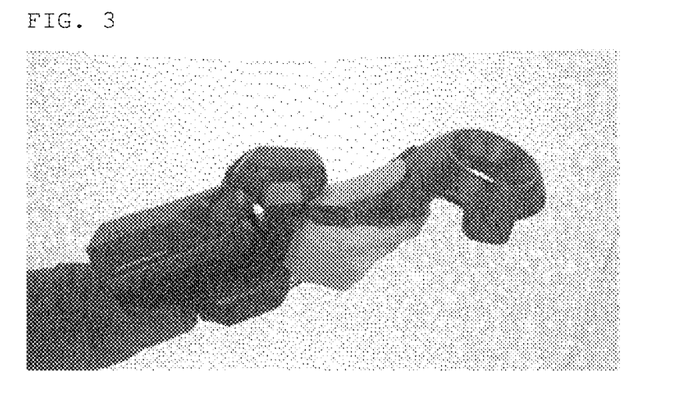
FIG. 3 is a diagram illustrating that the interface device according to the embodiment of the present invention is worn.

FIG. 3 is an image attached to help understanding an interface device according to the present invention, illustrates wearing of the interface device 1 according to an embodiment of the present invention, and is a diagram limited to a wrist module of a body module that can be attached to various body portions to provide a service according to an embodiment of the present invention.

Figure 4:
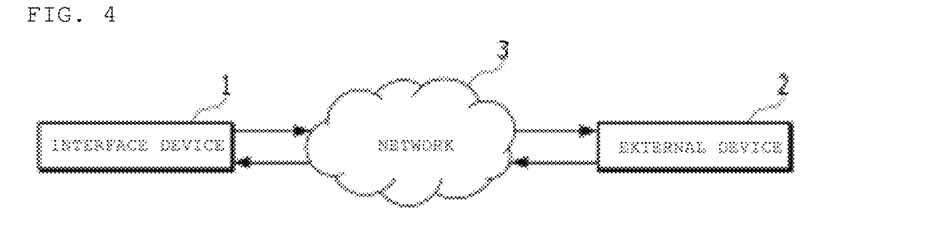
FIG. 4 is a conceptual diagram illustrating a concept in which the interface device according to the embodiment of the present invention can be connected to an external device through a wired or wireless network.

FIG. 4 is a diagram illustrating a concept in which an interface device 1 according to an embodiment of the present invention can be connected to an external device 2 through a wired or wireless network.

The external device 2 means various kinds of devices such as PC, mobile terminal, and kiosk which can receive a set signal from the interface device 1 through a wired and/or wireless network or can transmit a control signal to the interface device 1. The device may receive information and/or signals of the external device 2 in which virtual reality contents are being reproduced and may transmit force feedback to the interface device 1 which a user is wearing, or information about state, movement, and the like of a user who is using the interface device 1 may be transmitted to the external device 2 through a network.

In other words, the interface device 1 according to the embodiment of the present invention recognizes joint movement of a part of user's body such as a hand and an arm, generates a signal, and can control movement of user's body by transmitting the generated signal to the external device 2 or receiving a control signal from the external device 2.

To this end, the interface device 1 according to the embodiment of the present invention may further include a control unit 60, a communication unit (not illustrated), and a rotation recognition unit 340 and a power unit 300 provided in the power module 30.

In addition, when the second power module 50 is additionally provided for the interface device 1, the second power module 50 may be formed to have the same configuration as the power module 30.

The communication unit (not illustrated) performs a function of transmitting and receiving a signal through a network 3. In other words, the communication unit of the interface device 1 according to the embodiment of the present invention receives a control signal through the network 3 and transmits the control signal to the control unit 60, or transmits a signal such as rotation angle, movement state, and movement information generated in accordance with rotation of the grip module 20 to the external device 2. In other words, the control unit 60 may receive a signal based on movement information such as rotation from the rotation recognition unit 340 in accordance with movement such as rotation of the grip module 20, figure out the rotation angle, movement state, movement information, and the like from the signal, generate a signal based on information such as rotation angle, and transmit the signal to the external device 2.

The rotation recognition unit 340 is a constituent element which is connected to the grip module 20 and generates a signal according to movement such as rotation of the grip module 20 and transmits the signal to the control unit 60.

To this end, the rotation recognition unit 340 according to the embodiment of the present invention may include at least one of sensors which measure change in value through user's movement such as a variable resistor, an acceleration sensor, a gyro sensor, and a tilt sensor to measure movement in a rotational, horizontal, and/or vertical direction and a movement state of the grip module 20. For example, when the rotation recognition unit 340 is a variable resistor, the control unit 60 can figure out a rotation angle of the grip module 20 with change in a resistance value.

The power unit 300 is a constituent element operated when receiving a control signal from the control unit 60, and the grip module 20 can be switched to a freewheeling state, a no-load state, or a load-state in accordance with the operation of the power unit 300.

The control unit 60 is a constituent element which controls overall operation for each constituent element of the interface device 1, and performs a signal processing function and the like. In the present invention, the control unit 60 may figure out information about movement such as a rotation angle through a signal about rotation and/or movement transmitted from the rotation recognition unit 340 formed in the power module 30, and generate information about movement such as a rotation angle signal and transmit the generated information to the external device 2 through the communication unit.

In addition, when the control unit 60 receives a control signal from the external device 2 through the communication unit, the control unit 60 determines whether the control signal is a power unit operation signal. When the control signal is the power unit operation signal, the control unit 60 operates the power unit 300, and when the control unit 60 is a power unit stop signal, the control unit 60 stops the power unit 300, so it is possible to be utilized to switch the grip module 20 to a freewheeling state, a no-load state, or a load state. To this end, the power module 30 may be connected to the control unit 60 by wire or wireless.

Hereinafter, a detailed configuration and operation process of the power module 30 which switches the grip module 20 to the freewheeling state, the no-load state, or the load state through the power unit 300 in the power module 30 will be described below in more detail.

As described above, the freewheeling state may be defined as a state where resistance according to a mechanical configuration does not occur, and physical coupling is released (cutoff) between the grip module 20 and the power module 30 to freely move such as rotation in accordance with user's intention, that is, the grip module 20 can freely move without mechanical resistance. The no-load state distinct from this is a state where power transferred to the grip unit 20 through the power unit 300 is not supplied, but is a state where mechanical resistance according to a physical coupling configuration (engagement or the like) between the grip module 20 and the power module 30 occurs in a certain level, and the load state may be defined as a state where power is supplied through the power unit 30, rotational force different from user's intention is applied to the grip module 20 through power (rotational force) transmitted to the grip module 20 additionally through a physical configuration in which the grip module 20 and the power module 30 are coupled, thereby putting restriction on movement based on user's free intention. In other words, the load state according to the present invention may be defined as a state where movement of the grip module 20 rotating in a set direction is generated through rotational force generated by driving of the power module 30, and resistance capable of controlling user's operation contrary thereto, that is, stronger than the no-load state, is generated to restrict user's free movement.

In other words, the main object of the present invention is to classify states into a freewheeling state where the grip module 20 and the power module 30 are physically uncoupled not to apply physical restriction, limitation, resistance, or the like to movement or rotation of a wrist of a user who is using the interface device 1, a load state where the movement of the grip module 20 is restricted by the power module 30, and a no-load state where a certain level of torque (a certain level of resistance is provided to user's wrist movement or the like) is necessary in movement such as rotation of the grip module 20 between both extremes defined as a freewheeling state and a no-load state, and to selectively implement a no-load state having a broad spectrum to adjust from a state where substantially like the freewheeling state can be implemented to a state substantially like the load state in accordance with physical, mechanical, electrical resistance and the like of internal constituent elements of the power module 30.

In addition, such a configuration, and a function and an advantage according thereto can be similarly applied to the n-th grip module and the n-th power module capable of corresponding thereto as well as the second grip module 40 and the second power module 50 described above, and hereinafter will be described in more detail on the basis of the grip module 20 and the power module 30.

Figure 5:
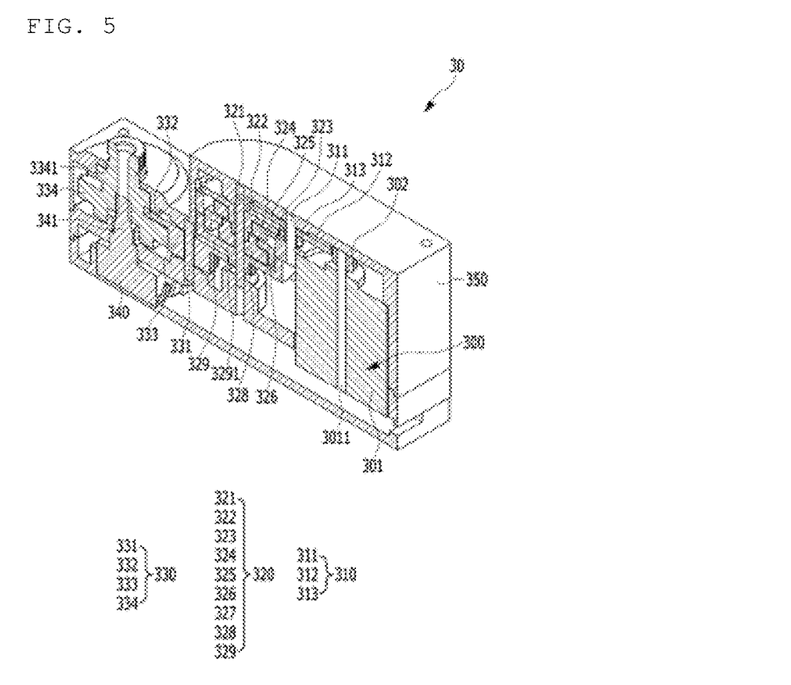
FIG. 5 is a diagram illustrating a power module of an interface device according to an embodiment of the present invention.
Figure 6:
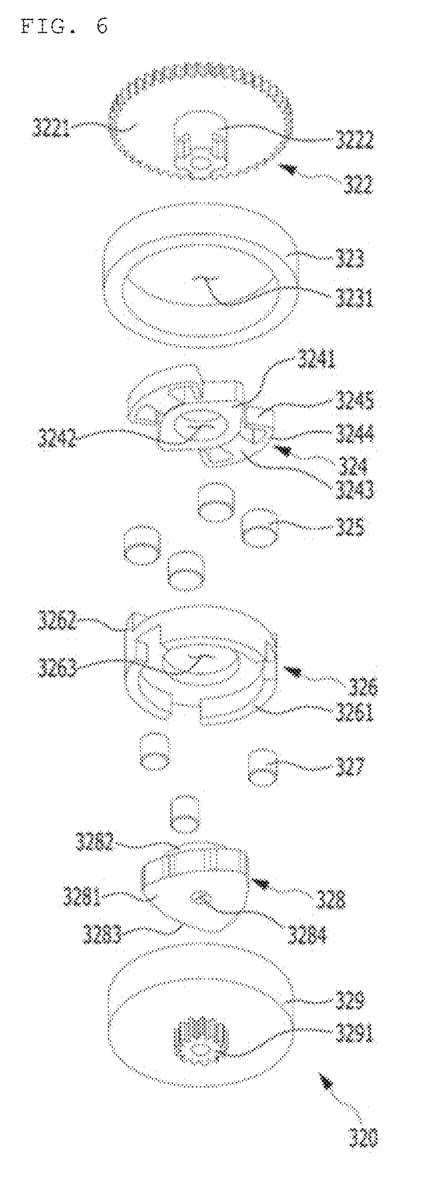
FIG. 6 is an exploded perspective view of a clutch unit of an interface device according to an embodiment of the present invention.

FIG. 5 is a diagram illustrating a power module 30 of an interface device 1 according to an embodiment of the present invention, and FIG. 6 is an exploded perspective view of a clutch unit 320 according to an embodiment of the present invention.

As illustrated in FIG. 5, the power module 30 according to the embodiment of the present invention may include a housing 350, a power unit 300 accommodated in the housing 350, an input unit 310, a clutch unit 320, and an output unit 330.

The power unit 300 performs a function of generating rotational force in accordance with supply of power from a motor 301 and transferring the rotational force to the input unit 310. To this end, the power unit 300 according to the embodiment of the present invention may include a motor 301 provided with a motor shaft 3011, and a motor gear 302 formed on the motor shaft 3011, and the rotational force of the motor 301 may be transferred to the motor gear 302 through the motor shaft 3011.

The input unit 310 performs a function of receiving the rotational force generated from the power unit 300, and to this end, the input unit 310 according to the embodiment of the present invention includes a first shaft 311, a first gear 312, and a second gear 313. The first shaft 311 is coupled to the housing 350 to be disposed in parallel to the motor shaft 3011, and the first gear 312 engages with the motor gear 302 and receives the rotational force of the motor gear 302. In this case, it is preferable that the first gear 310 is formed to have a diameter larger than a diameter of the motor gear 302 to reduce a rotation speed of the motor gear 302. The second gear 313 is formed on the lower surface of the first gear 312, and can be rotated together in accordance with the rotation of the first gear 312. However, for simplification of a configuration, the clutch unit 320 according to the embodiment of the present invention may be directly connected to the power unit 300 without a separate input unit 310 and receive power (link of movement such as rotational force).

The output unit 330 performs a function of receiving the rotational force from the clutch unit 320 to be described later and outputting the rotational force to the grip module 20 again, or receiving movement such as rotation of the grip module 20.

Specific configurations of the power unit 300, the input unit 310, and the output unit 330 described above can be seen with reference to FIG. 6.

As illustrated in FIG. 6, the clutch unit 320 has a configuration capable of transferring the rotational force received from the input unit 310 to the grip module 20 connected to the output unit 330, and performs a function of enabling the grip module 20 to selectively switch to any one of the freewheeling state, the no-load state, and the load state in accordance with an internal coupling state of the clutch unit 320 and generation of rotational force according to the power module 30, more specifically, supply of power of the power unit 300.

The clutch unit 320 according to the embodiment of the present invention can be switched to the load state when the power (rotational force or the like) is supplied by the power unit 300, and supports to be selectively switched to the freewheeling or no-load state when the supply of power is blocked by the power unit 300.

To this end, the clutch unit 320 according to the embodiment of the present invention may include a second shaft 321, a power unit connection portion 322, an outer housing 329, an armature 326, a power transmission cam 328, and a roller 327.

In addition, the clutch unit 320 according to the embodiment of the present invention may further include a resistance module 324 which is coupled to the armature 326 or is attachable to and detachable from the armature 326 in accordance with setting.

As illustrated in FIG. 6, the second shaft 321 denotes a member which is coupled to the housing 350 to be disposed in parallel to the first shaft 311.

The power unit connection portion 322 has a through-hole to which the second shaft 321 can be inserted, is coupled to the second shaft 321 to be rotatable, and can receive rotational force based on driving according to the supply of power from the motor 301 in the power unit 300. According to the embodiment of the present invention, as illustrated in FIG. 6, the power unit connection portion 322 may be provided to have a configuration of transferring the rotational force of the second gear 313 to the power transmission cam 328 to be described later, and, as illustrated in FIG. 6, may additionally include a disc 3221 and a rotation shaft 3222 formed at the center of the disc 3221, in which teeth (saw teeth) of a gear capable of engaging with the second gear 313 are formed to protrude outwards on the outer circumferential surface of the disc 3221, and the power unit connection portion 322 can be rotated together in accordance with rotating of the second gear 313. In addition, the rotation shaft 3222 of the power unit connection portion 322 according to the embodiment of the present invention can be inserted with the power transmission cam 328 and the resistance module 324 to be described later.

In addition, a third inner housing 323 which prevents the second rollers 325 from escaping may be disposed on the lower surface of the power unit connection portion 322 according to the embodiment of the present invention. The third inner housing 323 is provided with a through-hole 3231 in a length direction, and the second rollers 325 and the resistance module 324 may be inserted into the through-hole 3231 of the third inner housing 323. In addition, the outer housing 329 which prevents the roller 327 from escaping may be disposed on the lower surface of the third inner housing 323. The outer housing 329 may be provided with a through-hole in a length direction and coupled to the second shaft 321, and the roller 327, the power transmission cam 328, and the armature 326 are settled in the through-hole. In addition, the outer housing 329 may be provided with a third gear 3291 at a lower surface thereof, and the third gear 3291 may be rotated together in accordance with rotating of the outer housing 329.

As illustrated in FIG. 6, FIGS. 7A, 7B and 7C, or FIG. 8, the resistance module 324 denotes a module which performs a function of attaching or detaching the roller 327 to and from the outer housing 329 by changing a relative rotation speed of the outer housing 329 and the amateur 326. To this end, the resistance module 324 according to the embodiment of the present invention may be provided in various forms as illustrated in FIG. 6, FIGS. 7A, 7B and 7C, or FIG. 8.

As illustrated in FIG. 6, the resistance module 324 according to the embodiment of the present invention is formed in a friction plate shape in which a plurality of second rollers 325 are disposed to be separated, and can change a speed of the armature 326 by friction. More specifically, the resistance module 324 includes the third inner housing 323, the second rotation transmission portion 324, and the second rollers 325 and generates friction resistance to the rotation of the armature 326, and thus it is possible to generate rotation speed difference between the armature 326 and the power transmission cam 328 rotated by receiving rotational force through the power unit 300. To this end, the resistance module 324 is made of a material having dynamic stability, and can reduce a rotation speed of the second roller portion 325, that is, a rotation speed of the armature 326.

As seen on the basis of the configuration of the resistance module 324 illustrated in FIG. 6, the second rollers 325 and the second rotation transmission portion 324 have a configuration of being rotated by receiving the rotational force from the armature 326, and can be inserted to the through-hole 3231 of the third inner housing 323. The second roller 325 may be formed in a cylindrical shape similarly to the roller 327, one surface thereof may come in contact with the power unit connection portion 322, and the other surface may come in contact with the armature 326. In this case, the armature 326 may include one or more second arc portions 3262 formed along the circumference of the other surface, and the second rollers 325 are positioned between the second arc portions 3262 and are pushed and rotated in accordance with the rotation of the armature 326. It is preferable that the number of second arc portions 3262 is half the number of second rollers 325. For example, when the number of second roller portions is n, the number of second arc portions 3262 may be n/2 (n≥2).

In addition, referring to FIG. 6, the resistance module 324 according to the embodiment of the present invention may include a body 3241, a first extension portion 3243 extending from the body 3241, a second extension portion 3244 extending from the first extension portion 3243, and a third extension portion 3245 extending from the second extension portion 3244.

The body 3241 may be formed of an oval cylinder provided with a through-hole 3242 at the center thereof, and the rotation shaft 3222 of the power unit connection portion 322 can be inserted to the through-hole 3242. The first extension portion 3243 may be formed to extend vertically from the body 3241, and the second extension portion 3244 may be vertically bent and extend from one end of the first extension portion 3243 to both sides. The third extension portion 4345 may be vertically curved from one end of each second extension portion 3244 toward the body 3241 and extend. In this case, the first extension portions 3243 to the third extension portions 3245 may be formed integrally. In addition, since the first extension portions 3243 to the third extension portions or the third extension portions 3245 are formed of a material having dynamic stability, the third extension portions 3245 may be curved toward the first extension portions 3243. In this case, the second rollers 325 are disposed to come in contact with the third extension portions 3245. More specifically, the second rollers 325 are pushed and rotated by the second arc portion 3262 in accordance with rotating of the armature 326, and the resistance module 324 is pushed and rotated by the second rollers 325. In this case, the third extension portions 3245 of the resistance module 324 coming in contact with the second rollers 325 are bent in toward the first extension portions 3243, and the attachment of the third inner housing 323 engaging with the second rollers 325 is released, thereby rotating the third extension portions 3245. In this case, the rotation speed of the armature 326 is reduced by force pushing the third extension portions 3245 to change the relative rotation speed of the power transmission cam 328 and the armature 326. The rollers 327 are attached to the outer housing 329 as rotation speed difference of the power transmission cam 328 and the armature 326 occurs, and outer housing 329 is rotated together with the armature 326 by the rollers 327 coming in close contact with the outer housing 329. In other words, it is a state where the rotational force of the motor 301 is being transferred to the output unit 330 through the input unit 310 and the clutch unit 320, and the clutch unit 320 can implement the load state where the output unit 330 cannot be freely moved or is restricted by the external force.

Meanwhile, when the rollers 327 attached to the outer housing 329 are detached from the outer housing 329, the outer housing 329 can be freely moved by the external force which may be generated by the user. In other words, the clutch unit 320 can implement the freewheeling state where the output unit 330 can be freely moved by external force.

In summary, as illustrated in FIG. 6, when the rollers 325 are rotated, the resistance module 324 coming in contact with the second rollers 325 is also pushed and rotated in accordance with the rotation of the second rollers 325. In this case, since the second arc portions 3262 are positioned on both sides of the second rollers 325, the resistance module 324 which is in the traveling direction irrespective of the rotation direction (forward rotation, reverse rotation) of the armature 326 can be also pushed and rotated.

To this end, the resistance module 324 according to the embodiment of the present invention is formed of a material having dynamic stability, and can effectively generate rotation speed difference between the power transmission cam 328 and the armature 326. In other words, due to the rotation speed difference between the power transmission cam 328 and the armature 326, the rollers 327 are attached to the first arc portion 3261 on the rotation direction side and the inner circumferential surface of the outer housing 329, and the third extension portions 3245 are positioned between the first extension portions 3243, thereby generating the rotation speed difference between the power transmission cam 328 and the armature 326 irrespective of rotation directions (forward rotation, reverse rotation).

The power transmission cam 328 is a cam member which is connected to the power unit connection portion 322 and can be rotated in accordance with rotational force transferred from the power unit connection portion 322, and it may be positioned in the armature 326. To this ends, as illustrated in FIG. 6, the power transmission cam 328 according to the embodiment of the present invention may include a plate-shaped main body 3281 which is provided with a through-hole in a length direction and a rotation center shaft 3282 which extends from one surface of the main body 3281 in a vertical direction, and the roller contact surface 3283 for contact with one or more rollers 327 may be formed on the outer circumferential surface of the main body 3281.

As illustrated in FIG. 6, the armature 326 is formed of a disc provided with a through-hole 3263, one or more second arc portions 3262 are formed on one surface thereof along the circumference thereof, and one or more first arc portions 3261 are formed on the other surface thereof along the circumference thereof. In this case, one or more rollers 327 are disposed between the first arc portions 3261, the rollers 327 are pushed and rotated in accordance with rotating of the power transmission cam 328, and the armature 326 provided with the first arc portions 3261 is also pushed and rotated together. The second rollers 325 are disposed on both sides of the second arc portion 3262, and the second rollers 325 are also pushed and rotated in accordance with rotating of the armature 326.

As illustrated in FIG. 6 and FIGS. 7A, 7B and 7C, one or more rollers 327 are provided as cylindrical elastic members and are members which can be pushed and rotated in accordance with rotating of the power transmission cam 328.

As described above, the outer housing 239 may include the third gear 3291 formed on one surface thereof to be rotatable, and may also be provided in a from where the output unit 330 coupled to the third gear 3291 can be rotated together in accordance with rotating of the outer housing 329. In addition, the outer housing 329 can be rotated through a coupling structure of the output unit 330 and the third gear 3291 coupled to the grip module 20 which is movable such as rotation in accordance with user's intention. In addition, the outer housing 329 can implement a selective function of changing a relative rotation speed of the armature 326 to attach or detach the rollers 327 to and from the outer housing 329 in accordance with friction resistance based on the resistance module 324, thereby selectively implementing the freewheeling state, the no-load state, and the load state of the grip module 20 coupled to the output unit 330.

The switching to the freewheeling state, the no-load state, and the load state through the resistance module 324 illustrated in FIG. 6 will be described below in more detail.

As described above, the freewheeling state may be defined as a state where resistance according to a mechanical configuration does not occur, and physical coupling is released (cutoff) between the grip module 20 and the power module 30 to freely move such as rotation in accordance with user's intention, that is, the grip module 20 can freely move without mechanical resistance. The armature 326 is physically completely detached from the outer housing 329 by the resistance module 324, so the outer housing 329 is not restricted by the armature 326 and the power unit 300 at all, thereby it is possible to implement the freewheeling state where the grip module 20 can be move in unparallel (it is possible to implement a state where free rotation and movement are possible by user's intention by a state where physical coupling of the outer housing 329 and the armature 326 is released) in the first and second directions with respect to the wrist module 10.

The implementation of the state where the armature 326 is physically completely detached by the resistance module 324, as a premise of a state where power from the motor 301, that is, rotational force based on the power unit 300 is not supplied to the power transmission cam 328 (a state where power transferred to the grip unit 20 through the power unit 300 is not supplied), is a state where the roller 327 which does not receive pushing rotational force by the power transmission cam 328 is not fitted in close contact between the first arc portions 3261 of the armature 326 (a loose state is kept) and thus is a state where the outer housing 329 is not restricted by the armature 326 accommodated in the outer housing 329, so the user can move such as rotating the grip module 20 in accordance with user's free intention, and it is possible to implement the freewheeling state where the user does not feel separate restriction in movement of the grip module 20.

The no-load state distinct from this is a state where power transferred to the grip unit 20 through the power unit 300 is not supplied, but is a state where a certain level of mechanical resistance according to a physical coupling configuration (for example, the output unit 330 is coupled to the grip module 20 through the third gear 3291) between the grip module 20 and the power module 30 is occurring, and means a state where a certain level of resistance restricts movement of the grip module 20 NIIaccording to user's intention by a mechanical coupling configuration in the power module 20 connected through the clutch unit 320.

Differently from this, the load state may be defined as a state where power is supplied through the power unit 30, and power (rotational force) generated in the power module 30 transferred to the grip module 20 is additionally transferred through a physical configuration in which the grip module 20 and the power module 30 are coupled through the clutch unit 320, thereby applying rotational force different from user's intention to the grip module 20, and putting restriction on movement of the grip module 20 by user's free intention. In other words, the load state according to the present invention may be defined as a state where movement of the grip module 20 rotating in a direction set through the configurations of the clutch unit 320 and the output unit 330 is generated through rotational force generated by driving of the power module 30, and resistance capable of controlling user's operation contrary thereto, that is, stronger than the no-load state, is generated to restrict user's free movement.

In order to implement such a function, the output unit 330 according to the embodiment of the present invention includes a third shaft 331, a fourth gear 332, a fifth gear 333, and a sixth gear 334. The third shaft 331 may be coupled to the housing 350 to be disposed in parallel to the second shaft 321.

The fourth gear 332 is provided with a through-hole to which the third shaft 331 is inserted and is coupled to the third shaft 331 to be rotatable, engages with the third gear 3291, and receives rotational force of the third gear 3291.

The fifth gear 333 is formed to protrude downwards from the lower surface of the fourth gear 332. Since the fifth gear 333 is formed in connection on one surface of the fourth gear 332, the fifth gear 333 is rotated together in accordance with rotating of the fourth gear 332.

The rotation recognition 340 is a constituent element which detects an angle of the sixth gear 334, is positioned in one area of the housing 350, and is provided at the center thereof with a measurement shaft 341 for measuring the angle of the sixth gear. The sixth gear 334 is provided with a through-hole capable of being coupled to the measurement shaft 341, is coupled to the measurement shaft 341, engages with the fifth gear 333, and can transfer the rotational force transferred from the fifth gear 333 to the measurement shaft 341.

According to the embodiment of the present invention, the sixth gear 334 may further include an extension portion 3341 which is formed to extend vertically from one surface and protrudes out of the housing 350, and the extension portion 3341 may be connected to the grip module 20.

The extension portion 3341 may output the rotational force transferred from the clutch unit 320 out of the housing 350, or may transfer the rotation of the grip module 20 to the rotation recognition unit 340. In other words, the rotation recognition unit 340 can measure the rotation angle of the grip module 20.

In addition, according to the embodiment of the present invention, there may be an n-th power unit in addition to the power module 30, and in this case, a configuration of the n-th power unit may be the same as the configuration of the power module 30.

Figure 9A:
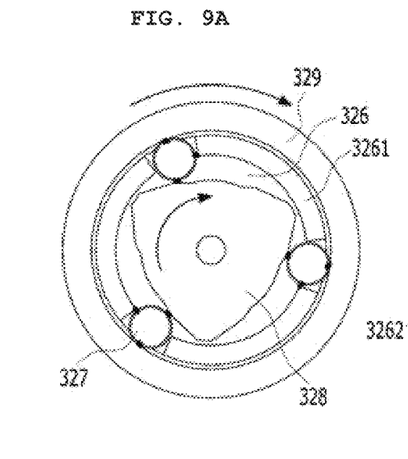
FIG. 9A is a cross-sectional view of an outer housing, an amateur, a power transmission cam, and the like at the time of switching to a load state.
Figure 9B:
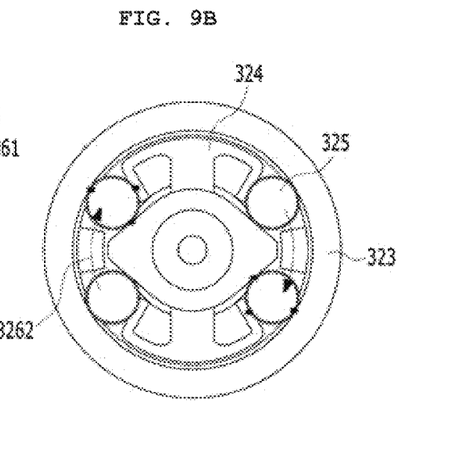
FIG. 9B is a cross-sectional view of a third inner housing, a resistance module, and the like at the time of switching to a load state.

FIGS. 9A and 9B are diagrams illustrating the clutch unit 320 at the time of load switching of the interface device 1 according to the embodiment of the present invention, FIG. 9A is a cross-sectional view of the outer housing 329, the amateur 326, the power transmission cam 328, and the like at the time of switching to the load state, and FIG. 9B is a cross-sectional view of the third inner housing 323, the resistance module 324, and the like at the time of switching to the load state.

In this case, the load state may be implemented as a state where the power unit connection portion 322 is rotated by the second gear 313 engaging with the disc, the rollers 327 are attached to the outer housing 329, and the outer housing 329 is rotated together with the armature 326 and cannot be rotated by external force.

When the second gear 313 rotates, the rotational force of the second gear 313 is transferred to the power transmission cam 328 through the rotation shaft 3222, the first rotation transmission portion 328 is rotated, and the power transmission cam 328 pushes and rotates the rollers 327 coming in contact with the roller contact surface 3283. In this case, the rollers 327 disposed between the first arc portions 3261 are pushed and rotated, and the armature 326 provided with the first arc portions 3261 is pushed by the rollers 327 and also rotated together thereby. The second rollers 325 disposed between the second arc portions 3262 are also pushed and rotated in accordance with rotating of the armature 326, and the resistance module 324 positioned before the second rollers 325 in the rotation direction is also rotated together. In this case, the third extension portions 3245 of the resistance module 324 are curved toward the first extension portions 3243 by the second rollers 325 positioned in the rotation direction of the second arc portion 3262 and reduce the rotation speed of the armature 326, and rotation speed difference occurs between the power transmission cam 328 and the armature 326. The rollers 327 are attached to the outer housing 329 due to the rotation speed difference, and the outer housing 329 is rotated together with the armature 326 by the rollers 327 coming in close contact.

The no-load state has the same coupling structure and state of the clutch unit 320 in the load state, and presupposes a state where there is no power, that is, rotational force from the power module 30 through the power unit connection portion 322.

Figures 10A, 10B:
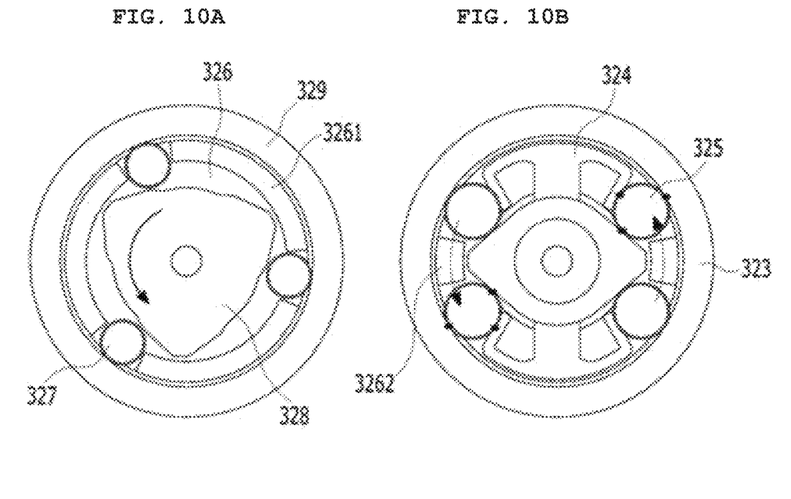
FIG. 10A is a cross-sectional view of an outer housing, amateur, a power transmission cam, and the like at the time of switching to a freewheeling state.
FIG. 10B is a cross-sectional view illustrating a third inner housing, a resistance module, and the like at the time of switching to a freewheeling state.

FIGS. 10A and 10B are diagrams illustrating the clutch unit 320 at the time of switching to the freewheeling state of the interface device 1 according to the embodiment of the present invention, FIG. 10A is a cross-sectional view of the outer housing 329, the amateur 326, the power transmission cam 328, and the like at the time of switching to the freewheeling state, and FIG. 10B is a cross-sectional view of the third inner housing 323, the resistance module 324, and the like at the time of switching to the freewheeling state.

In this case, even when the outer housing 329 is rotated, the rotational force of the outer housing 329 is not transferred to the power transmission cam 328. In other words, referring to FIGS. 10A and 10B, when the second gear 313 is rotated (hereinafter, reverse rotation) in a direction opposite to the rotation direction of the second gear 313, the rotational force of the second gear 313 is transferred to the power transmission cam 328, and the power transmission cam 328 is reversely rotated. In this case, the power transmission cam 328 can push and reversely rotate the rollers 327 coming in contact with the roller contact surface 3283. In this case, the rollers 327 disposed between the first arc portions 3261 are pushed and reversely rotated, the amateur 326 provided with the first arc portions 3261 is pushed by the rollers 327 and reversely rotated together.

Thereafter, the second rollers 325 disposed between the second arc portions 3262 are pushed and reversely rotated in accordance with reverse rotating of the armature 326, and the resistance module 324 positioned in front of the second arc portions 3262 in the rotation direction is also reversely rotated. In this case, the third extension portions 3245 of the resistance module 324 are bent toward the first extension portions 3243 and reduce the rotation speed of the armature 326, and rotation speed difference occurs thereby between the power transmission cam 328 and the armature 326.

The rollers 327 coming in close contact with the outer housing 329 and the armature 326 are detached from the outer housing 329 and the armature 326 due to such rotation speed difference.

Thereafter, when the power transmission cam 328 is rotated by a space of the extent not attachable to the rollers 327, the rollers 327 do not come in contact with the power transmission cam 328 and do not come in close contact with the outer housing 329 and the armature 326. Accordingly, even when the outer housing 329 is rotated, configurations of the other clutch unit 320 therein are not rotated in accordance with the rotation of the outer housing 329. In other words, the outer housing 329 may be the freewheeling state which is freely rotatable.

Figure 7A:
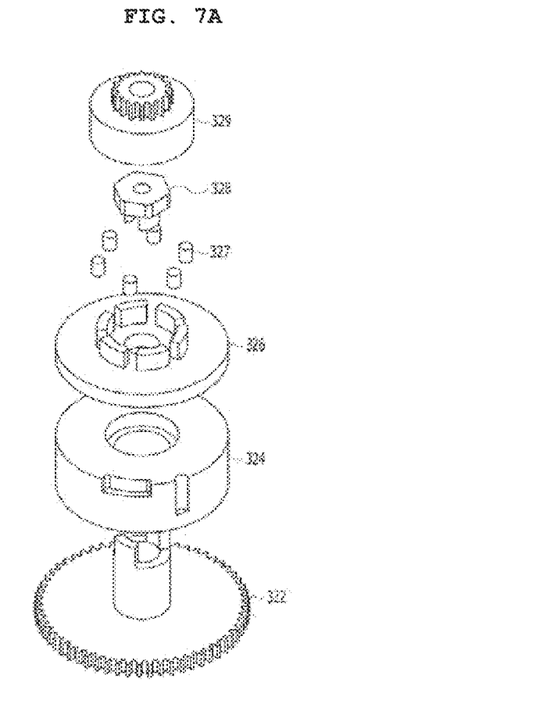
FIG. 7A is an exploded perspective view of a clutch unit in another from according to another embodiment of the present invention.
Figure 7B:
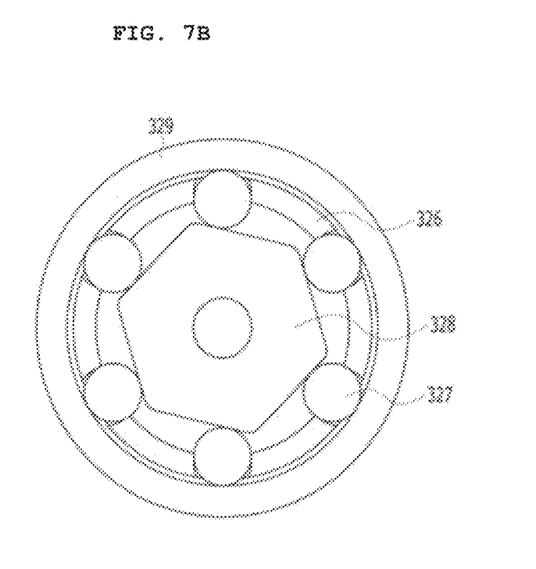
FIG. 7B is a plan view of the clutch unit.
Figure 7C:
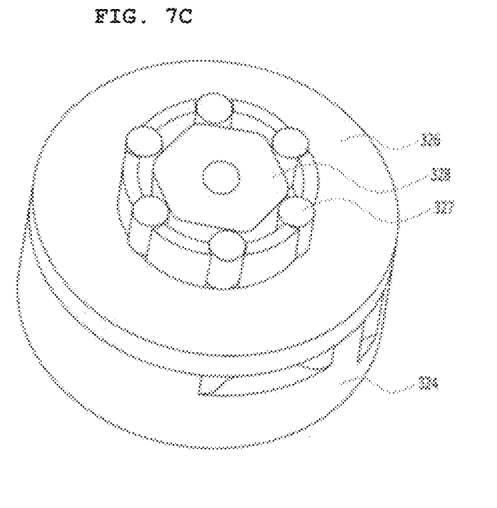
FIG. 7C is a perspective view of the clutch unit.

FIG. 7A is an exploded perspective view of another form of clutch unit 320 according to the embodiment of the present invention, and FIG. 7B is a plan view of the clutch unit 320, and FIG. 7C is a perspective view of the clutch unit 320.

As can be seen from FIGS. 7A, 7B and 7C, the clutch unit 320 according to the embodiment of the present invention may include a power unit connection portion 322 (in the case of structures and functions, see the description based on FIG. 6), a resistance module 324, an amateur 326, rollers 327, a power transmission cam 328, and an outer housing 329.

As illustrated in FIGS. 7A, 7B and 7C, the resistance module 324 is attached to the lower surface of the amateur 326, and performs a role of adjusting a rotation speed of the amateur 326 rotated by the rollers 327 rotated in accordance with rotation of the power transmission cam 328, thereby implementing a freewheeling state of the interface device 1.

To this end, the resistance module 324 according to the embodiment of the present invention may be provided as a solenoid performing a role of an electromagnet.

When the resistance module 324 is provided as the solenoid and the armature 326 provided at the upper end of the resistance module 324 is provided as a magnetic substance, it is possible to reduce a rotation speed of the armature 326 rotated in accordance with rotation of the power transmission cam 328 through friction resistance in accordance with voltage applied to the resistance module 324.

Referring to FIGS. 7A, 7B and 7C, classification and switching to the freewheeling state, the no-load state, and the load state will be additionally described.

The freewheeling state may be implemented as a state where the armature 326 is completely physically detached from the outer housing 329 by the resistance module 324, the outer housing 329 is not restricted by the power module 300 including the armature 326 and the power unit 300 at all, and the grip module 20 is movable in unparallel in first and second directions with respect to the wrist module 10. In this case, the unparallel movement means a state where the grip module 20 is freely rotatable and movable by user's intention by a state where the outer housing 329 and the armature 326 are physically uncoupled.

Meanwhile, the load state means a state where the grip module 20 by a user and the rotational force transferred to the outer housing 329 through it are restricted through supply of power by the power unit 300 in a state where the outer housing 329 and the armature 326 are physically coupled through one or more rollers 327 fitted between the arc portions formed on the upper surface of the armature 326. The no-load state can be selectively implemented as a no-load state where supply of power by the power unit 300 is blocked in a state where the outer housing 329 and the armature 326 are physically coupled through the rollers 327 fitted between the arc portions of the armature 326 but the grip module 20 by a user and the rotational force transferred to the outer housing 329 through it restrict movement of the grip module 20 of a user by a physical coupling structure of the power module 30 and the grip module 20, that is, mechanical resistance through the clutch unit 320 and the output unit 330.

In order to implement such a differentiated state, when voltage equal to or higher than a predetermined level (threshold value) set in the resistance module 324 is applied in a situation in which there is no supply of rotation power through the power unit 300, the armature 326 is physically completely detached from the outer housing 329, and it is possible to implement a freewheeling state where movement such as free rotation and forward, backward, left, and right motion is possible in a state where the outer housing 329 is not restricted by armature 326 accommodated therein and the power module 30 connected thereto.

Meanwhile, when the power transmission cam 328 is rotated in accordance with supply of power by the power unit 300, the rollers 327 are pushed and rotated in accordance with rotation of the power transmission cam 328, the armature 326 is rotated according thereto, and it is possible to implement a load state where the armature 326 and the outer housing 329 are coupled to each other by being fitted between the arc portions of the armature 326 (some kind of wedge effect), the outer housing 329 is also rotated to control movement or rotation of the grip module 20. In this case, in order to maximize efficiency of the power unit 30, it is preferable that separate power is not applied to the resistance module 324 so that additional friction resistance is not generated in the armature 326.

Meanwhile, in a state where there is no supply of power by the power unit 300, that is, a state where power equal to or lower than a threshold value is applied to the resistance module 324 or power is not applied in a situation in which there is no rotation driving of the power transmission cam 328, it is possible to implement the no-load state where friction resistance is applied in rotation of the armature 326 having magnetism, rotation speed difference of the outer housing 329 and the armature 326 is generated in various ranges, and the outer housing 329 and the power module 30 are still coupled to transmit predetermined physical and mechanical restriction and resistance to the rotation of the grip module 20 of a user. Particularly, a value of power equal to or lower than a threshold value applied to the resistance module 324 is variously changed, and rotation speed difference and coupling strength between the outer housing 329 and the armature 326 are variously provided, thereby having characteristics of enjoying various force feedback according to the use of the device 1 of the user.

In other words, it is possible to restrict rotation of the armature 326 receiving friction resistance for rotation in accordance with size of friction resistance provided by the resistance module 324 positioned on the lower surface of the armature 326 connected through a wedge structure of a protrusion 327 to the outer housing 329 rotated together in accordance with rotation of the grip module 20 by a user (in other words, it is possible to change a friction resistance value in accordance with voltage magnitude equal to or lower than a threshold value applied to the resistance module 324 and to restrict a rotatable speed according thereto), and it is possible to restrict rotation or movement of the outer housing 329 connected to the armature 326 through the protrusion 328 in a predetermined range.

In addition, the clutch unit 320 according to the embodiment of the present invention adjusts physical coupling (A) of the power unit 300 and the grip module 20, more specifically, the formation or release of physical coupling of the outer housing 329 and the armature 326 through the protrusion 327 through the resistance module 324, the power module 30 adjusts generation or disappearance of rotational force (B) which can be transferred to the grip module 20 through the power unit 300, more specifically, through a coupling configuration of the output unit 300 and the third gear 3291, and it is possible to implement the interface device 1 which can selectively implement any one state of the no-load state, the load state, and the freewheeling state of the grip module 20 by selectively combining the formation and release of the physical coupling (A) through the resistance module 324 and the generation and disappearance of the rotational force (B) through power module 30.

As described above, such a freewheeling state, no-load state, and load state can be adjusted in accordance with request of an external device 3 connected through a network or a situation recognized through the control unit 60, the rotation recognition unit 340, or the like of the interface device 1 according to the embodiment of the present invention, that is, in accordance with a movement state and a rotation state of the grip module 20, user's necessity, or the like, and there is an advantage of further enhancing user's immersion through this.

Figure 8:
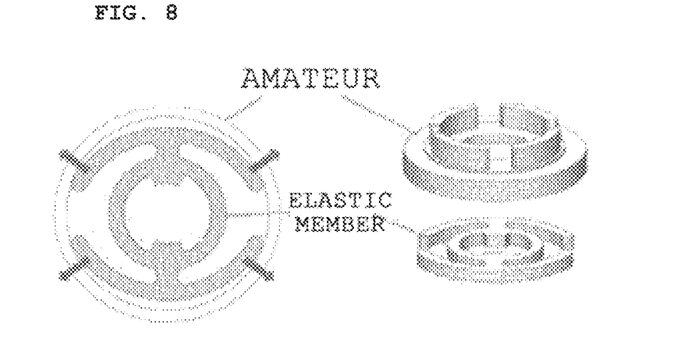
FIG. 8 is an exploded perspective view of a clutch unit in another form according to another embodiment of the present invention.

In addition, the clutch unit 320 according to the embodiment of the present invention may employ an elastic member such as a spring (light green member, referred to as 324 for convenience) as a type of the resistance module 324 as illustrated in FIG. 8. Identically to the clutch unit 320 according to another embodiment described above, the resistance module 324 illustrated in FIG. 8 performs a role of applying friction resistance to rotation of the armature 326 to generate rotation speed difference with the outer housing 329.

Figure 11:
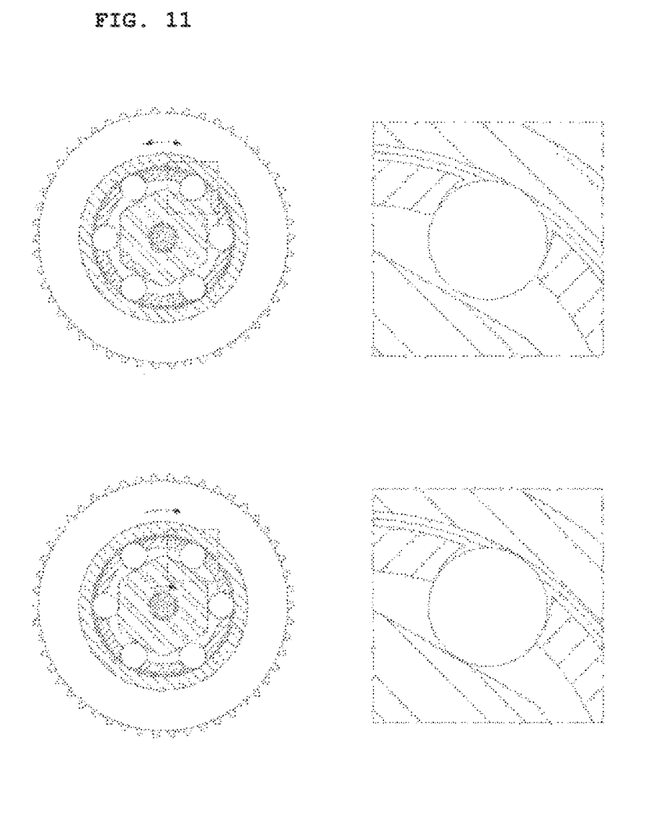
FIG. 11 is a diagram illustrating a clutch unit at the time of switching to a freewheeling state of an interface device according to an embodiment of the present invention.

FIG. 11 is a diagram illustrating the clutch unit 320 at the time of switching to the freewheeling state of the interface device 1 according to the embodiment of the present invention, two upper images of FIG. 11 illustrate that a hexagonal power transmission cam and circular rollers are separated at the time of switching to the freewheeling state, and two lower images of FIG. 11 illustrates a state where the rollers are attached to the hexagonal power transmission cam at the time of switching to the no-load or load state.

The description of the present invention is just an example, it could be understood that persons skilled in the art can easily modify the embodiments to a specific form without changing technical spirit or essential characteristics of the present invention. Therefore, it should be understood that the embodiments described above are exemplary in all aspects and are not limitative. For example, each constituent element described in a singular type may be embodied to be distributed, and constituent elements described as being distributed may be embodied in a coupled type likewise.

The scope of the present invention is represented by Claims to be described below rather than Detailed Description, and it should be interpreted that the meaning and scope of Claims and all modifications or modified forms derived from equivalent concept thereof are included in the scope of the present invention.

The description of the present invention is just an example, it could be understood that persons skilled in the art can easily modify the embodiments to a specific form without changing technical spirit or essential characteristics of the present invention. Therefore, it should be understood that the embodiments described above are exemplary in all aspects and are not limitative. For example, each constituent element described in a singular type may be embodied to be distributed, and constituent elements described as being distributed may be embodied in a coupled type likewise.

The scope of the present invention is represented by Claims to be described below, and it should be interpreted that the meaning and scope of Claims and all modifications or modified forms derived from equivalent concept thereof are included in the scope of the present invention.

A mode for carrying out the present invention has been described together in Description of Embodiments.

INDUSTRIAL APPLICABILITY

The present invention relates to an interface device, and more specifically, to an interface device which receives user's motion data and provide external force and impact, and has industrial applicability.

The invention claimed is:

1. An interface device comprising:
a body which is attachable to a part of user's body;
a power supply which has one end portion coupled to the body and supplies power; and
a grip which is movable by the power received from the power supply,
wherein the grip is movable in a first direction and a second direction with respect to the body, and the first direction may not be parallel with the second direction,
wherein the power supply includes:
a power unit which generates rotational force; and
a clutch unit which transfers the rotational force received from the power unit to the grip, and
wherein the power supply selectively implements any one state of:
a no-load state where the power unit and the grip are physically coupled through the clutch unit;
a load state where the power unit and the grip are physically coupled through the clutch unit, and the rotational force of the power unit is transferred to the grip; and
a freewheeling state where the power unit and the grip are physically uncoupled through the clutch unit,
wherein the resistance module controls formation or release of physical coupling between the power unit and the grip through the clutch unit, and
wherein the power supply controls generation or extinction of rotational force which can be transferred to the grip through the power unit, and selectively implement any one state of the no-load state, the load state, and the freewheeling state of the grip by selectively combining the formation and release of the physical coupling through the resistance module and the generation and extinction of the rotational force through the power supply.

2. The interface device according to claim 1, wherein the resistance module is a solenoid.

3. The interface device according to claim 2, wherein the freewheeling state is a state where the power unit and the grip are physically uncoupled through the clutch unit in accordance with supply of voltage equal to or more than a threshold value to the resistance module, and rotational force is not transferred through the power unit.

4. The interface device according to claim 1, wherein the resistance module is a spring.

5. The interface device according to claim 1, wherein the clutch unit includes:
an outer housing which is coupled to the grip;
a power transmission cam which is accommodated in the outer housing and receives the rotational force from the power supply; and
an armature which receives the rotational force of the cam by a plurality of rollers in a state of being accommodated in the outer housing, and is rotatable in accordance with pushing rotation of the rollers, and
wherein the armature generates rotation speed difference between the outer housing and the armature by the resistance module.

6. The interface device according to claim 5, wherein the freewheeling state is a state where the armature is physically completely uncoupled from the outer housing by the resistance module, the outer housing is not controlled by the armature and the power unit at all, and the grip is movable in unparallel in the first and second directions, and
wherein the unparallel movement is implemented in a state capable of free rotation and movement by user's intention by a state where the physical coupling between the outer housing and the armature is released.

7. The interface device according to claim 5, wherein the load state is a state of controlling the rotational force of the outer housing by a user through supply of power by the power unit in a state where the outer housing and the armature are physically coupled through the plurality of rollers fitted between arc portions of the armature.

8. The interface device according to claim 5, wherein the no-load state is implemented in a no-load state of not controlling the rotational force of the outer housing by a user through power supply cutoff by the power unit in a state where the outer housing and the armature are physically coupled through the plurality of rollers fitted between arc portions of the armature.

9. The interface device according to claim 1, wherein the body is a wrist module which is wearable on a wrist of user's body.

10. The interface device according to claim 1, wherein the body is an elbow module which is wearable on a part of a cuff of user's body, and
   wherein the grip is movable in the first direction with respect to the elbow module, and the first direction is substantially parallel to a movement direction of user's body joint on which the elbow module is worn.

* * * * *